Jan. 17, 1950 C. E. MORLEY 2,495,123
FASTENING DEVICE
Filed Oct. 25, 1947 2 Sheets-Sheet 1
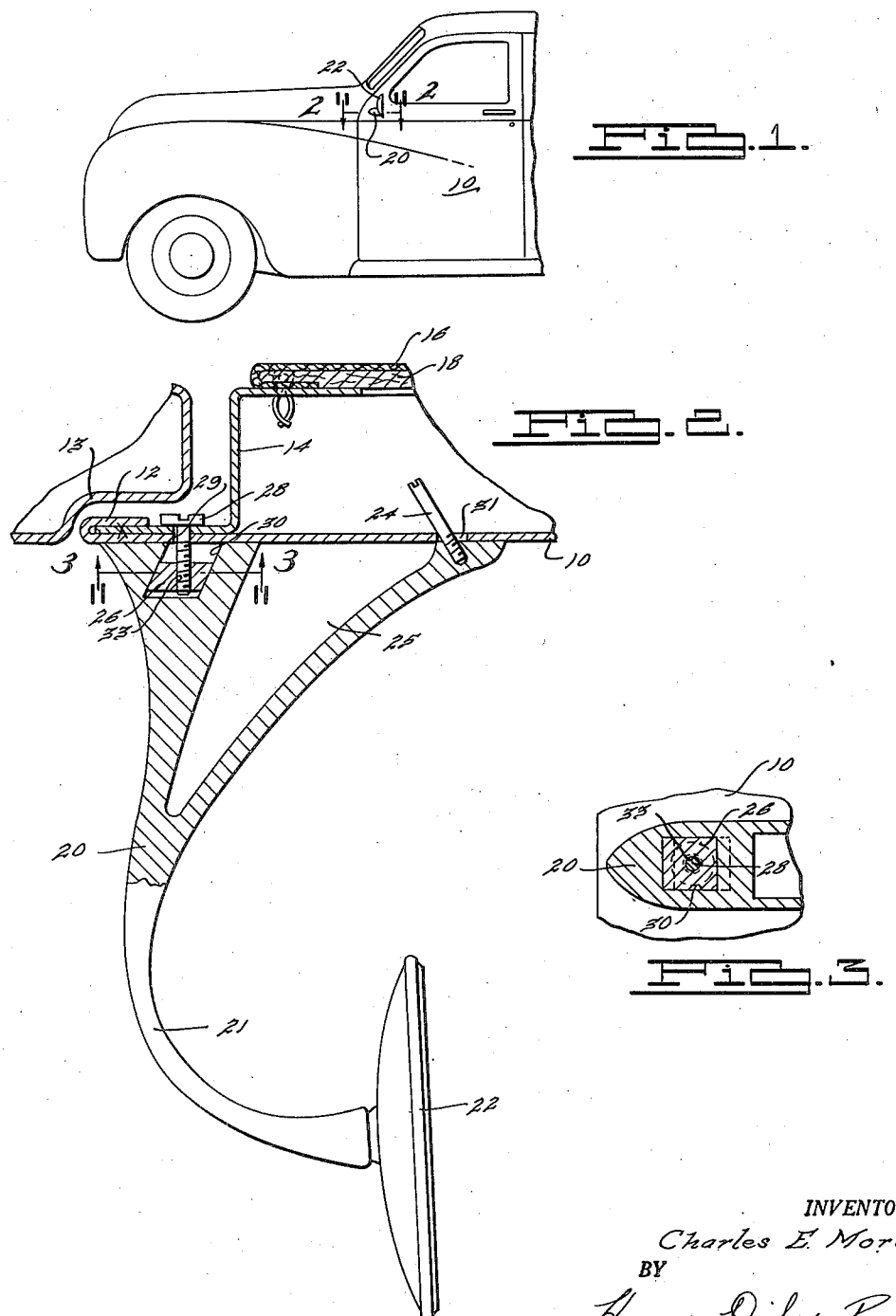
INVENTOR.
Charles E. Morley.
BY
Barness, Dickey & Pierce.
ATTORNEYS.

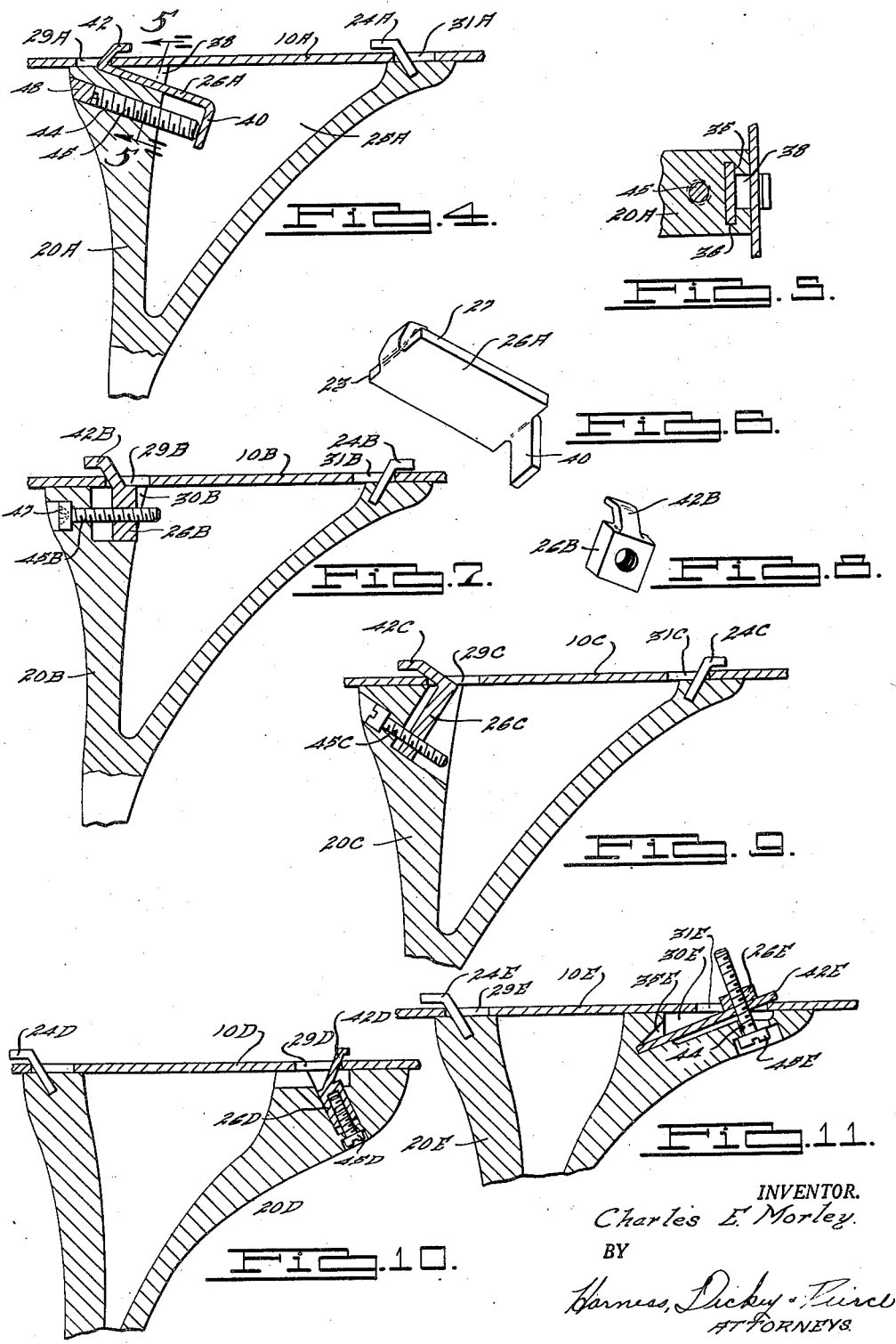

Patented Jan. 17, 1950

2,495,123

UNITED STATES PATENT OFFICE 2,495,123

FASTENING DEVICE

Charles E. Morley, Detroit, Mich.

Application October 25, 1947, Serial No. 782,119

4 Claims. (Cl. 248—226)

The present invention relates to fastening devices, and particularly to fastening means adapted to provide for the attaching of supporting brackets and the like to relatively thin walls or panels such as those used in automobile bodies and other sheet metal structures. Although the invention finds particular utility in securing automobile accessories such as rear vision mirrors upon automobile bodies, the usefulness of the development is not restricted to the field indicated.

An important object of the invention is to provide attaching means of the indicated variety which is inconspicuous in character, so that an ornamentally designed object may be supported in a manner which does not detract from its appearance, and which is adapted to provide a fastening which renders unwanted removal of the attached object difficult, so that virtually theft-proof mounting is provided for automobile accessories and the like.

Another object is to provide improved means whereby automobile accessories and the like may be mounted more quickly and easily than is possible with presently used fastening means, while in connection with such mounting a lesser degree of accuracy is required in the positioning of holes for the holding parts, and important monetary savings are effected in addition to the attainment of a superior mounting.

Other objects and advantages will be apparent upon consideration of the present disclosure in its entirety.

In the drawings:

Figure 1 is a fragmentary and somewhat diagrammatic side elevational view of the front portion of an automobile provided with an accessory outside rear vision mirror attached by securing means constructed in accordance with the present invention;

Fig. 2 is a horizontal sectional plan view taken substantially on the line 2—2 of Fig. 1 and looking in the direction of the arrows;

Fig. 3 is a sectional detail taken substantially on the line 3—3 of Fig. 2 and looking in the direction of the arrows;

Fig. 4 is a view similar to Fig. 2 but with the mirror and a part of the supporting arm broken away, showing a modified construction;

Fig. 5 is a sectional detail taken substantially on the line 5—5 of Fig. 4 and looking in the direction of the arrows;

Fig. 6 is a perspective view of a clamping member employed in the embodiment of Fig. 4;

Fig. 7 is a view similar to Fig. 4 showing another modified construction;

Fig. 8 is a perspective view of a clamping nut employed in the embodiment of Fig. 7;

Figs. 9, 10 and 11 are views similar to Fig. 7 showing further modified constructions.

Referring now to the drawing, reference character 10 designates the outer sheet metal panel of a door of a closed automobile body, which is illustrated as typifying a sheet metal support with which my improved fastening means is adapted to cooperate. The door is indicated as provided with a marginal flange 12 and as being of hollow boxlike construction, the inner panel of the door being of composite construction, including a marginal sheet metal portion designated 14 which is crimped to outer panel 10 at the folded flange 12 and which covers only a portion of the interior of the door, the completion of the enclosure of the inner portion of the door being effected by a panel designated 18 indicated as provided with a fabric covering 16. Although the upholstered inner panel is removable to permit access to the interior of the door, such removal and access are relatively troublesome, since such doors are usually provided with operating parts for the door and for raising and lowering the window, etc., at least some of which parts must be removed before the panel may be removed. Where an accessory device such as a rear view mirror and bracket assembly is to be installed upon the outer face of the door, therefore, the attachment thereof from the inside of the door in such manner as to make the accessory relatively theftproof when the door is locked, is a troublesome matter which, since it consumes considerable time of a workman, is also relatively expensive. It is in fact not practical to incur the expense involved in installing such devices by fastening means applied from within the door, so that it has become the common practice to install the same from outside with simple sheet metal screws. Mirrors and other accessory devices so attached are readily removable from outside the car and thefts thereof are common. Outside attachment of such devices by means of screws is also objectionable for the reason that the spacing of the drilled holes for the screws must be accurate, or else enlarged screw holes must be provided in the base of the accessory device, which is apt to cause uneven mounting.

With the preferred mounting means shown in Fig. 2 the portions used to attach the accessory rear view mirror depicted therein are not only inaccessible when the door is closed and locked, but all attaching elements are concealed from view, so that the base of the accessory may be of neater appearance than is possible where exposed screws are employed.

The base 20 and integral bracket arm 21 extending outwardly therefrom are of die-cast construction and support the rear view mirror 22, these parts being indicated as of general form and construction which have become relatively common in the art. The base portion is provided with a flat bottom surface adapted to bear against the side of the door 10. The base is elongated in a direction which is longitudinal of the car when the device is installed, to provide a more rigid support and a pleasing streamlined appearance, and the base may be interiorly cored out, as indicated at 25, for conservation of material.

The lip flange 12 of the door is shown as adapted to overlie an appropriately recessed portion 13 of the body of the vehicle in the usual manner. Weather stripping of a suitable, compressible character is ordinarily provided to seal the joint between the door and body, but has been omitted from the drawing for clarity of illustration, since it forms no part of my present invention. The bracket base is preferably attached to the door in such manner that the portion of the base which projects forwardly from the cored-out section 25 overlies the lip flange 12, and an aperture 29 is drilled or otherwise suitably formed in the flange at the desired height of attachment of the mirror. A second aperture 31 is drilled through the outer door panel at a point spaced rearwardly from the aperture 29 and so positioned as to receive the angular holding stud 24 which serves as securing means for the rear extremity of the elongated bracket base structure. Stud 24 is shown as screwed into a suitably tapped opening and as extending inwardly and forwardly from the rear extremity of the base.

In the forward portion of the bottom surface of the bracket base is an opening 30 which is preferably of non-circular cross section and which inclines in a direction opposite to the inclination of the stud. As best shown in Fig. 3, this opening is of rectangular cross section in my preferred form and may be formed in the casting of the base structure by the provision of a suitable core. Opening 30 is of substantially uniform cross section throughout its length and slidably receives therein a nut 26. Both the opening and the body of the nut are formed as similar parallelepipeds, the nut having its base parallel to the bottom of the bracket base structure. The nut is proportioned to slide easily within the opening 30 and is provided with a tapped opening 33 perpendicular to the base of the nut and accordingly perpendicular, when the nut is fitted into the opening 30, to the general plane of the inner surface of the mounting structure. The tapped opening in the nut is adapted to receive the stem of the bolt 28, which is adapted to be projected through the opening 29 in the lip 12 of the door and threaded into the nut, the head of the bolt lying inside of the lip.

In installing the improved mirror mounting structure shown, the screw 28 is not inserted until the mirror is otherwise in position. The mirror and bracket assembly with the complete mounting structure assembled as shown, except for the bolt 28, is placed in position against the door panel 10 with stud 24 projected into the opening 31. The assembly is manually held in this position while the bolt is projected through hole 29 and into the nut. The bolt is then tightened in the conventional manner, and during such tightening the nut acts as a cam, forcing the entire mounting structure to the left, as the parts are viewed in Fig. 2, driving the stud 24 against the forward margin of the opening 31 and the stem of the bolt 28 against the rearward margin of hole 29. The angular disposition of the stud 24 causes it to serve as a hook which is held in overhanging relation with respect to the inner surface of panel 10 by the camming and holding action of the cam nut 26. All clearance between the bracket base structure and the door panel is taken up, and such structure is drawn and held tightly against the face of the door, by the inward component developed by the angular stud 24 as well as by the inward component of the force exerted upon the front face of opening 30 by the engaging inclined front face of the cam nut 26.

Due to the longitudinal sliding movement between the parts, extreme accuracy in the relative positioning of the openings 29, 31 is not essential, as any differences within the limits of movement of the cam nut 26 will be taken up as the latter is tightened. Positive holding engagement between both ends of the bracket base structure and the door is effected despite the fact that access need not be had to the interior of the door in order to insert the stud 24. If weather stripping (not shown) is carried by the lip 12 of the door, the stripping may be pushed to one side or loosened in the area of the hole 29 and screw 28, to permit the forming of the hole and the insertion of the screw, as will be readily apparent.

In the modified construction shown in Fig. 4, I have provided mounting means also shown associated with a mirror supporting structure but which is adapted for installation where no access is possible or practicable to the back of a flange or to any rear or interior surface, as for example where a mirror is to be installed upon the side of a door rearwardly of the overhanging lip flange thereof. The general configuration of the base portion of the supporting bracket structure will be seen to conform to that of the previously described embodiment, and like parts are designated by corresponding reference characters distinguished by the addition of the letter "A" to each. A hooked-shaped fixed holding lug 24A is indicated as carried by the rear extremity of the base portion of the bracket structure 20A. The lug is indicated as cast in place and of such angular form as to project forwardly behind the supporting panel 10A when the bracket assembly is moved forwardly by tightening of the fastening means carried by the forward extremity of the base assembly. The fastening means comprises a sheet metal slide member 26A formed of relatively heavy stock, provided with marginal portions 27, 29 adapted to project into guide slots 35, 36 formed in the base near the lower face of its forward end and inclined downwardly toward and opening in the bottom surface of the base near the forward extremity of the latter. The guide slots 35, 36 form the opposite sides of a relatively wide opening which the plate 26A bridges, while a narrower slot portion 38 connects the guide slot portions 35, 36 with the bottom face of the base structure throughout the length of such guide portions. At its rear extremity the plate 26A is provided with an outwardly bent tongue 40 while at its forward extremity the plate carries a tongue defining an integral inwardly and rearwardly bent hook-shaped holding lug portion 42. It will be seen that when the plate 26A is slid rearwardly in its guide slots, the hooked portion 42 is moved in the same direction and is also drawn back towards the supporting bracket structure. The lug portion 42 is somewhat narrower than the connecting slot 38 so that the plate may be inserted by sliding the same into position from within the cored opening 25A.

A tapped hole 44 is formed in the base in outwardly spaced but parallel relation with respect to the slide plate 26A and its guide portions, and a screw 45 is fitted therein and adapted to project into the cored opening 25A to engage the inner face of the lug 40 in such manner that the slide plate may be moved by turning the screw.

In installing the embodiment of Figs. 4–6, holes as 29A, 31A are drilled in appropriate spacing in the supporting panel 10A, the holes being large enough to admit the hooked lug portions 24A, 42 to be moved thereinto axially. Despite the fact that the screw 45 inclines toward the panel 10A, it may be easily manipulated by means of a screwdriver to force the hooked portion 42 rearwardly and so urge the supporting bracket and lug 24A forwardly and inwardly against the face of the panel. It will be noted that the screw exerts an inward force urging the bracket inwardly, which inward force is augmented by the camming action derived from the inclination of the panel-engaging portion of the hook 42, and that a similar camming action is exerted by the oppositely inclined panel-engaging portion of the hooked lug 24A.

After the bracket assembly is tightened in place, as shown in Fig. 4, a pellet or plug of a suitable blocking material may be driven into the open end of the hole 44 to prevent removal of the screw 45. This may comprise a pellet of lead shot which may be placed in the opening and then struck as with a hammer and punch so that the lead is caused to flow outwardly and bind tightly against the inner surface of the tapped opening 44. Removal of such a peened lead shot is relatively troublesome and serves as a sufficient deterrent to discourage sneak thieves, because it cannot be picked free with a sharp implement except very slowly and laboriously, and cannot be drilled out sufficiently to permit easy removal of the screw, since a drill could only be made to enter the opening 44 in a direction substantially parallel to the surface of the panel 10A after installation, so that the drill could not remove all of the lead overengaging the head of the screw.

In Figs. 7 and 8, I have shown a further modification having certain parts corresponding to those already disclosed and which will need no detailed redescription, such corresponding parts being designated by like reference characters distinguished by the addition of the letter "B" to each. The fixed holding lug 24B corresponds generally to the lug 24A of the last-described embodiment, but is indicated as extending rearwardly rather than forwardly, although this will be perceived to be subject to variation. At the forward extremity of the base structure a special nut 26B is provided rigidly carrying a hooked holding lug 42B indicated as integral with the nut. The nut is longitudinally slidable in an opening 30 B which, like the nut, may be of suitable non-circular cross-section, these parts being indicated as square in the drawings. The nut is held with respect to the base structure by the bolt 45B, which extends substantially parallel to the bottom surface of the base, but is relatively inconspicuous when the device is installed. If desired, the head of the bolt may be provided with a socket as 47 of the Phillips or Allen type, into which a small lead pellet or other suitable plug may be driven to prevent removal of the bracket by loosening of the bolt.

The further modification shown in Fig. 9 is essentially similar to that depicted in Figs. 7 and 8 except that the holding nut 26C and integral hooked lug 42C are formed of sheet metal, and arranged to slide in a path which is inclined with respect to the inner base surface. The screw 45C is of course similarly inclined, so that if the screw hole is plugged in the manner above described, removal of the plug is rendered more difficult. Although the hooked holding lug member of this embodiment is so arranged that the hooked portion is moved inwardly as the screw is tightened, the slope of the inclined body engaging portions of the hook 42C is great enough to cause such inclined portion to bind against the supporting panel 10C. The outward movement of the hooked portion 42C effected by tightening the screw will be seen to move the support structure bodily rearwardly, driving the rear hooked holding lug 24C into firm lateral and overhanging engagement with the body panel adjacent the back opening 31C.

In the embodiment of Fig. 10 the fixed holding lug 24D is carried by the forward extremity of the base structure although in other respects it corresponds to the lugs 24b, 24C of the last two described embodiments. The cooperating adjustable holding lug member is carried by the rearwardly extending and relatively thinner portion of the base and consists of a generally tubular nut 26D movable substantially perpendicularly with respect to the supporting panel and with respect to the bottom surface of the base and carrying a hooked lug portion 42D having an inclined portion 43D adapted to engage the side of the opening as 29D and to react thereagainst with a camming action as the hooked portion and nut are drawn outwardly in response to tightening of the bolt 45D. The action of the described portions of this embodiment will be seen to be similar in other respects to those of the embodiments already described.

A further embodiment shown in Fig. 11 also includes a fixed hooklike lug portion 24E carried by the forward extremity of the base structure and corresponding to the lug 42D of the embodiment last described. The rearwardly extending and relatively thinner toelike portion of the base carries supplemental fastening means comprising a rockable holding plate 42E mounted in a recess 30E formed in the bottom surface of the base and pivoted in an extension slot 35E formed in one end of the recess 30E and adapted to receive the inner end of the plate 42E, which inclines outwardly and rearwardly, and the rear extremity of which is adapted to project beyond the base and through an opening as 31E in the supporting panel as 10E. A simple nut and bolt, designated 26E, 45E, respectively, are employed to permit the plate to be drawn up against the inner surface of the panel 10E, the bolt 45E extending through a suitable aperture as 44E in the base and through a corresponding opening (undesignated) in the plate 42E. The nut 26E may be secured to the inner face of the plate 42E for ease of assembly, or a simple tapped opening in the plate may be used in lieu of a nut. It will be seen that when the holding portions 24E, 42E are passed through the openings as 29E, 31E in the panel 10E, the plate may be drawn up tight against the inner face of the panel, and that this will tend to drive the entire support forwardly, urging the fixed lug 24E against the edge of the opening 29E, so that both ends of the bracket base structure are tightly held against the face of the panel.

While it will be apparent that the preferred embodiments of my invention herein disclosed are well calculated to fulfill the objects and advantages above stated, it will be apparent that the invention is susceptible to variation, modification, and change without departing from the proper scope and fair meaning of the subjoined claims.

I claim:

1. Means for attaching a body to a relatively thin supporting panel, comprising in combination with such a body having a bottom face adapted to lie against the panel, a substantially fixed holding member projecting from said bottom face of the body, a movable holding element also projecting from said bottom face of the body in spaced relation to the fixed holding element, means for actuating the movable holding element including a cam nut and a bolt engaging said cam nut, the bolt being accessible only from said bottom face of the body, the cam nut being mounted in the body and movable in an inclined path, said movable holding element including an overhanging head portion of the bolt, said bolt including a stem portion threadedly interengaged with said cam nut.

2. Means for securing to a relatively thin supporting panel a body to be supported including a body having a bottom face adapted to lie substantially flush against the surface of such a panel, and having a projecting surface extending outwardly at an angle from said bottom face, a plurality of holding abutment portions projecting from the bottom face, including a substantially fixed abutment and a movable abutment, and means for actuating the movable abutment to vary the effective distance between said abutments including an actuating screw operatively connected to said movable abutment and accessible from said projecting surface, said actuating screw being entirely housed within an opening in said body, said opening terminating in said projecting surface and being convergently inclined with respect to said bottom face toward the outer end of said opening.

3. Means for securing to a relatively thin supporting panel a body to be supported including a body having a bottom face adapted to lie substantially flush against the surface of such a panel, and having a projecting surface extending outwardly at an angle from said bottom face, a plurality of holding abutment portions projecting from the bottom face, including a substantially fixed abutment and a movable abutment, and means for actuating the movable abutment to vary the effective distance between said abutments including an actuating screw operatively connected to said movable abutment and accessible from said projecting surface, said movable abutment comprising a laterally overhanging lug portion slidably secured to said body, said screw means engaging said portion to slidably move the same when the screw is manipulated.

4. Means as defined in claim 3 wherein said lug portion includes a plate section slidably fitted in overhanging guide portions integrally formed in the body and a tongue section projecting between said overhanging guide portions and from the body.

CHARLES E. MORLEY.

REFERENCES CITED

The following references are of record in the file of this patent:

UNITED STATES PATENTS

| Number | Name | Date |
| --- | --- | --- |
| 849,517 | Wanamaker et al. | Apr. 9, 1907 |
| 855,978 | Rapke | June 4, 1907 |
| 1,097,414 | Fort | May 19, 1914 |
| 1,335,881 | Dottl | Apr. 6, 1920 |